United States Patent [19]

Shiratori et al.

[11] Patent Number: 4,788,636

[45] Date of Patent: Nov. 29, 1988

[54] INTERACTIVE DEVICE FOR ENTERING GRAPHIC DATA

[75] Inventors: Hidefumi Shiratori; Seishu Kawashima; Hiromitsu Katoh, all of Abiko, Japan

[73] Assignee: Hitachi Seiki Co., Ltd., Tokyo, Japan

[21] Appl. No.: 860,176

[22] Filed: May 6, 1986

[30] Foreign Application Priority Data

May 7, 1985 [JP] Japan .................................. 60-96232

[51] Int. Cl.⁴ ............................................ G05F 15/46
[52] U.S. Cl. .............................. 364/191; 364/474.23; 364/474.25
[58] Field of Search ................................ 364/167–171, 364/188, 189, 191–193, 474, 475; 318/568

[56] References Cited

U.S. PATENT DOCUMENTS

| | | | |
|---|---|---|---|
| 4,490,781 | 12/1984 | Kishi et al. | 364/191 |
| 4,521,860 | 6/1985 | Kanematsu et al. | 364/191 |
| 4,556,833 | 12/1985 | Kishi et al. | 364/474 |
| 4,642,754 | 2/1987 | Kishi et al. | 364/191 |
| 4,646,228 | 2/1987 | Ikeda | 364/192 |
| 4,663,705 | 5/1987 | Kishi et al. | 364/191 |

Primary Examiner—Jerry Smith
Assistant Examiner—Allen MacDonald
Attorney, Agent, or Firm—Cushman, Darby & Cushman

[57] ABSTRACT

Disclosed is a device for inputting a list of the shape of a work which enables an operator to make a final list representing the shape of a work by entering elements and dimensions of the work based on a display representing the shape of the work which is stored in advance on the basis of a design drawing. The device comprises an operating unit having a display unit, a display processing unit for processing displaying operation to display the shape and dimensions of a work on the display of the operating unit, a graphic information processing unit for displaying a list table on the display of the operating unit, a memory for storing the pattern of the elements of the shape and the coordinate values of the list table, a display memory for storing the list processed by the graphic information processing means in order to display it on the display, an operator for converting the data of the display memory into the data of the coordinate position on the basis of the machining original point, a work shape list memory for storing the result of the operation, and a central processing unit which controls the memories and the processing unit.

1 Claim, 7 Drawing Sheets

F I G. 3(b)

| NO. | ELEMENT | FINAL DIAMETER | FINAL LENGTH | ANGLE | RADIAL/ CHAMFERING | CENTRAL DIAMETER | CENTRAL LENGTH | INTERSECTION |
|---|---|---|---|---|---|---|---|---|
| ① | ↗ | 18 | | 60 | | | | |
| ② | ↑ | | 27.5 | | | | | |
| ③ | ← | | 26 | | | | | |
| ④ | ↓ | | 55 | | | | | |
| | | | | | | | | |
| | | | | | | | | |
| | | | | | | | | |

FIG. 4(b)

| NO. | ELEMENT | INPUT LIST OF FINISHED WORK |||| GROOVE WIDTH || ROUGHNESS | CENTRAL DIAMETER PITCH KNURLING | CENTRAL LENGTH THREAD LENGTH KNURLING LENGTH | NECKING RIGHT LEFT | FINE THREADING FINISH | THREAD ANGLE |
| --- | --- | --- | --- | --- | --- | --- | --- | --- | --- | --- | --- | --- | --- |
| | | FINAL DIAMETER | FINAL LENGTH | ANGLE | RADIAL CHAMFERING | INTERSECTION | | | | | | | |
| ① | / | 20.00 | | 60 | | | | | | | | | |
| ② | ↑ | | 10.00 | | | | 50 ▷ | | | | | | |
| ③ | ⌐ | 30.00 | | | 5.00 | | 50 ▷ | | | | | | |
| ④ | ↑ | | 10.00 | | | | 12 ▽▽ | | | | | | |
| ⑤ | ← | | 12.50 | | | | 12 ▽▽ | | | | | | |
| ⑥ | ⌒ | | | | 1.00 | | 12 ▽▽ | | | | | | |
| ⑦ | ↓ | | 20.00 | | | | 50 ▷ | | | | | | |
| ⑧ | ⌒ | 65.00 | | | 10.00 | | 50 ▷ | | | | | | |
| ⑨ | ↓ | | 20.00 | | | | 50 ▷ | | | | | | |

INTERACTIVE DEVICE FOR ENTERING GRAPHIC DATA

BACKGROUND OF THE INVENTION

1. Field of the Invention

The present invention relates to a device for inputting a list of the shape of a work in an interactive operating apparatus of an NC machine tool.

2. Description of the Prior Art

An interactive graphic inputting device is conventionally known which interactively transforms inputted graphic data representing the shape of a work into the information which is required to machine the work by an NC machine tool. In inputting such graphic, the elements of the shape and the dimensions of the work are simultaneously input by keying in the order of the machining steps.

However, the above-described conventional graphic inputting device is inconvenient in that it requires a considerably long time for setting the machining procedures and in that when changing the shape of a work during machining, it is necessary to input new data from the beginning.

SUMMARY OF THE INVENTION

Accordingly, it is an object of the present invention to solve the above-described problems and to provide a device for inputting a list representing the shape of a work which enables an operator to make a list of the shape of a work in which the elements and the dimensions of the work are written by displaying the list representing the shape of the work, which has been stored in advance on a display, and by inputting the elements and dimensions of the work in the displayed list on the basis of the design drawing.

To achieve this aim, the present invention provides a device for inputting a list representing the shape of a work which enables the operator to make a final list of the shape of a work by directly inputting elements and dimensions data of the work on the list displayed on a CRT, while picturing the machining procedures of the shape from the design drawing of the material, or the work in the finished shape and the list in a work shape list memory. The device according to the present invention is composed of an operating unit having a display unit, a display processing unit for processing displaying operation to display the shape, and to store dimensions of a work on the display of the operating unit, a graphic information processing unit for displaying a list table on the display of the operating unit, a memory for storing the pattern of the elements of the shape and the coordinate values of the list table, a display memory for storing the list processed by the graphic information processing unit in order to display it on the display, an operator for converting the data of the display memory into the data of the coordinate position on the basis of the machining original point, a work shape list memory for storing the result of the operation, and a central processing unit which controls the memories and the processing means.

The use of a device for inputting the list of the shape of a work according to the present invention enables the shape of a work to be inputted quickly and facilitates a change in machining procedure or the reentry of data.

The above and other objects, features and advantages of the present invention will become clear from the following description of the preferred embodiment thereof, taken in conjunction with the accompanying drawings.

BRIEF DESCRIPTION OF THE DRAWINGS

FIG. 3(b) shows a list of the shape of the material made on the basis of the design drawing shown in FIG. 3(a) and displayed on the CRT of the interactive operating apparatus shown in FIG. 2(b); FIG. 4(b) shows a list of the finished shape of the work made on the basis of the design drawing shown in FIG. 4(a) and displayed on the CRT of the interactive operating apparatus shown in FIG. 2(b).

DESCRIPTION OF THE PREFERRED EMBODIMENT

An embodiment of the present invention will be described in detail hereinunder with reference to the accompanying drawings.

Figure 2A:
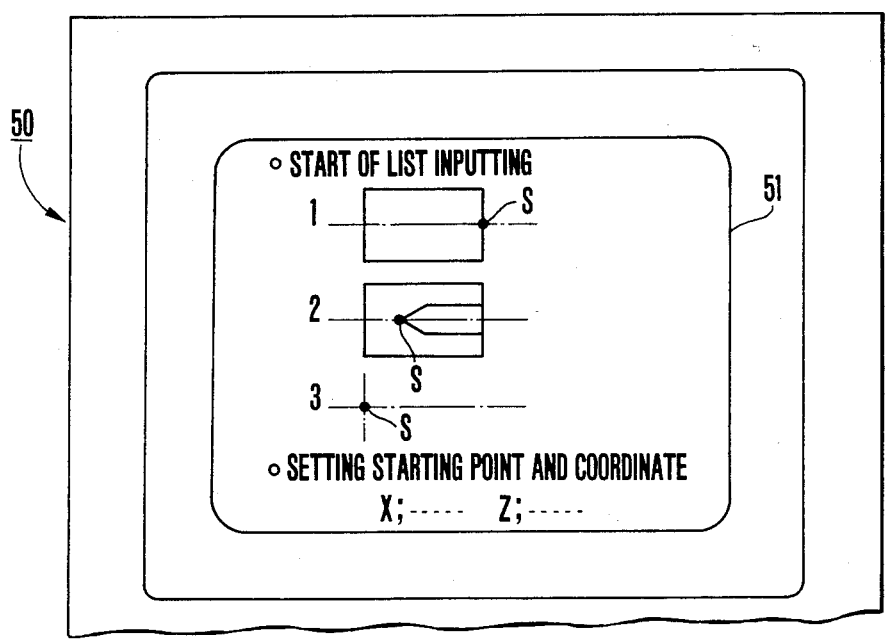
FIGS. 2(a) and 2(b) are elevational views of an interactive operating apparatus to which a device according to the present invention is applied.
Figure 2B:
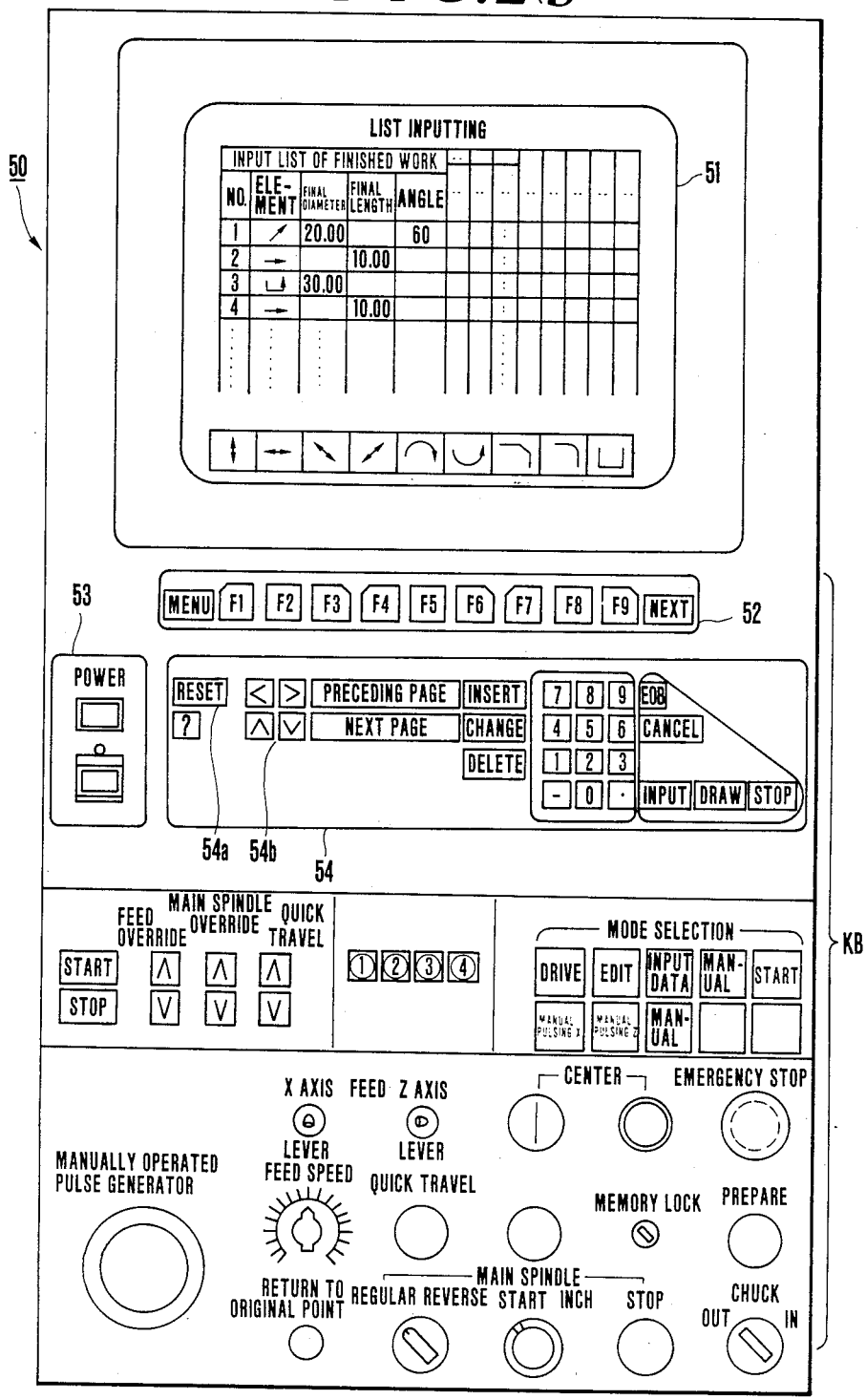

An interactive operating apparatus to which the present invention is applied will first be explained. FIG. 2(b) is an elevational view of an interactive operating apparatus to which the present invention is applied. Referring to FIG. 2(b), a CRT 51 which displays the shape elements and the dimensions of a work using a list inputting device in accordance with the present invention is attached to the upper portion of an operating apparatus 50. Various keys which are necessary for the operation of the operating apparatus and formation of machining data are arranged below the CRT 51. For example, Function keys 52, namely, the keys of "Menu", "F1", "F2", ... "F9" and "Next" are provided. These Function keys 52 assign the shape elements of a work, which are input and displayed on the CRT 51.

A power switch box 53 which operates as a power supply for the operating apparatus is attached to the left side of the Function keys 52. A console 54 that includes necessary keys such as a Reset key 54a, Cursor key 54b, Numeral keys 54c and an Input key 54d is mounted on the right side of the power switch box 53. At a portion below the console 54 is attached a control panel for operating an NC machine, which has no direct relation to the present invention.

A list of the shape of a work is displayed on the CRT 51 of the interactive operating apparatus 50, and the elements, dimensions, finished roughness and the like are input successively with the Function keys, Cursor keys and numeral keys on the basis of a design drawing, whereby a list of the shape of the work in which the elements, dimensions and finishing marks are written is completed.

The fundamental principle of the present invention will here be explained.

Figure 3A:
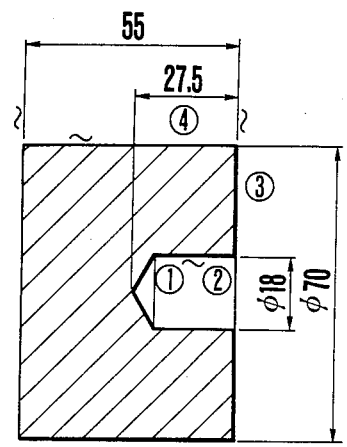
FIG. 3(a) is a design drawing to which the shape and the dimensions data of a material are input.

FIG. 3(a) is a design drawing which shows the data on the shape and dimensions of a material. FIG. 3(b) shows a list of the shape of a material completed by inputting the elements and dimension data in the list of the shape of the work which is displayed on the CRT of the interactive operating apparatus shown in FIG. 2(b) on the basis of the design drawing shown in FIG. 3(a).

A list of the items necessary for making a list of a material, namely, number, element, final diameter, final length and angle, in which no element marks and dimension data are written, as shown in FIG. 3(b), is made in advance, and is stored in a list memory.

This list in which no element marks and dimension data are written is displayed on the CRT 51. In a first step, the operator inputs data in the list corresponding to the design drawing shown in FIG. 3(a) while picturing the machining procedures. For example, the operator inputs the mark ∕ in the column of element, the numeral 18 in the column of final diameter and 60 in the column of angle using the Function keys and Numeral keys. In a second step, the mark →is input in the column of element, and the numeral 27.5 in the column of final length, in a third step, the mark ↑ and the numeral 26 are input in the columns of element and final length, respectively, and, further, in a fourth step, the mark ← and the numeral 55 are input in the columns of element and final length, respctively, whereby the list in which the elements and the respective dimension data are written is completed. This list of the shape of a work in which the elements and the respective data are written is temporarily stored in a display memory. This data, which is based on the design drawing, is processed in the operator of the central processing unit 1, converted to the value from the machining original point and is stored in a work shape list memory 7 as the data on the exact shape and the dimensions as the desired finished workpiece. This data is used as the work shape and dimension data when making data on work machining.

Figure 4A:
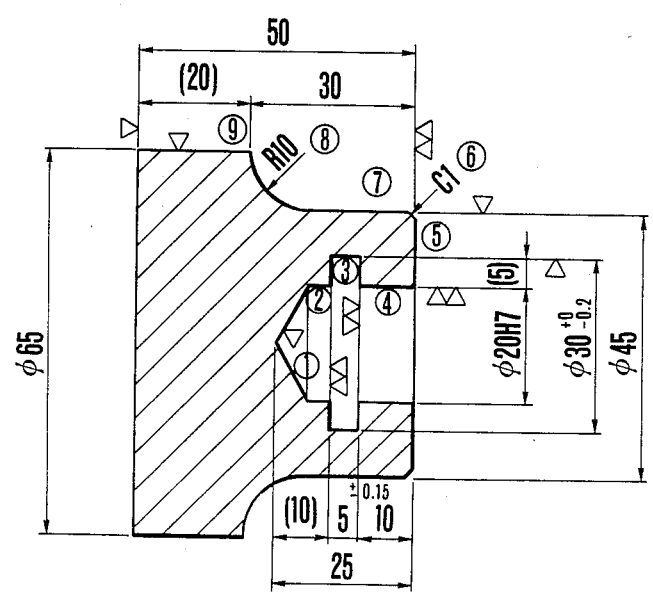
FIG. 4(a) is a design drawing to which the shape and the dimension data of the work in finished form are input.

FIG. 4(a) is a design drawing which shows the shape and the dimensions of the work in the finished form. FIG. 4(b) is a list of the shape of the finished work completed by inputting elements and dimensions in the list of the shape of the work displayed on the CRT of the interactive operating apparatus shown in FIG. 2(b) on the basis of the design drawing shown in FIG. 4(a).

In the same way as inputting the elements and dimension data in the list of the shape of the material, the operator inputs elements and dimension data in the respective columns of the list displayed on the CRT 51 in which no elements and dimension data are written by keying the Function keys and the Numeral keys on the basis of the machining procedures while seeing the design drawing shown in FIG. 4(a). In the step 1, the mark ∕ is input in the column of element, the numeral 20.00 in column of the final diameter, the numeral 60 in the column of angle and a finishing mark in the column of roughness. In the step 2, the mark →, the numeral 10.00 and a finishing mark are input in the columns of element, finished length and roughness, respectively. In the steps 3, 4, . . . to the step 9 necessary elements and dimension data are input successively, as shown in FIG. 4(b). With respect to the column of groove width and radial chamfering, since the mark in the columns of element shows discrimination between groove width and radial chamfering, input of the respective dimension data alone suffices.

This list in which the elements and the respective data of the steps 1 to 9 are written, as shown in FIG. 4(b), is converted by a list converter and the shape list in which the elements and the respective dimension data are written are temporarily stored in the display memory. This data, which is based on the design drawing, is processed in the operator of the central processing unit, converted to the value from the machining original point and are stored in the work shape list memmory 7 as the data on the exact shape and the dimension. This data is stored in the work shape list memory and is fed into a machining processing means as the work shape and dimension data to conduct predetermined machining. According to the present invention, unlike a conventional method of making a shape list by simultaneously inputting the elements and the dimension data of a shape, the operator makes a list by inputting elements and dimension data into a list which has been made in advance while picturing the procedure steps of the shape on the basis of a design drawing which shows the shape and the dimension data of a material or a finished work. Therefore, a list is made quickly and can easily facilitate a change in machining procedure or the reentry of data.

The concrete structure of the present invention will be explained on the basis of the fundamental principle of the present invention.

Figure 1A:
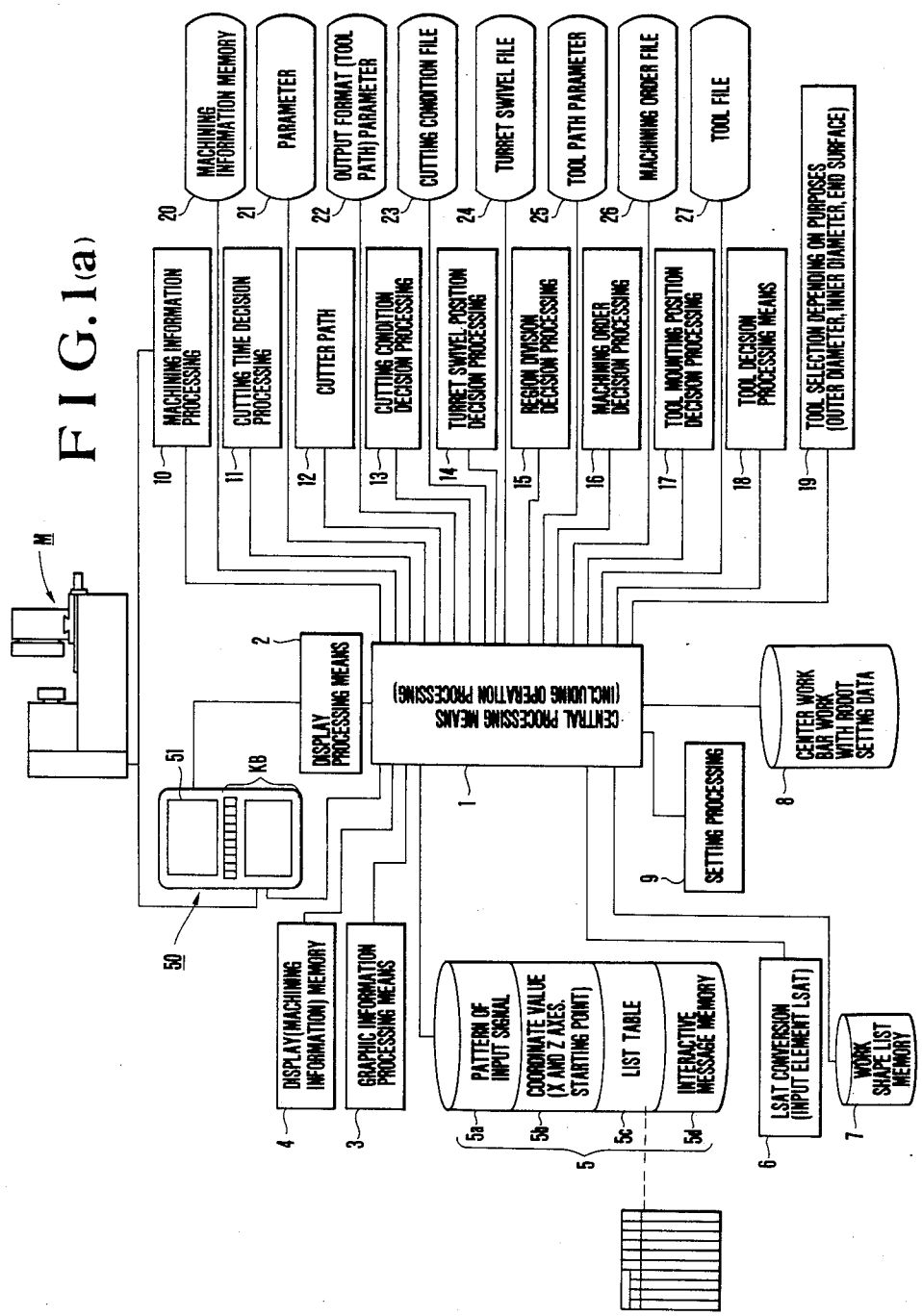
FIG. 1(a) is a block diagram which represents the controlling operation and structure of the present invention.
Figure 1B:
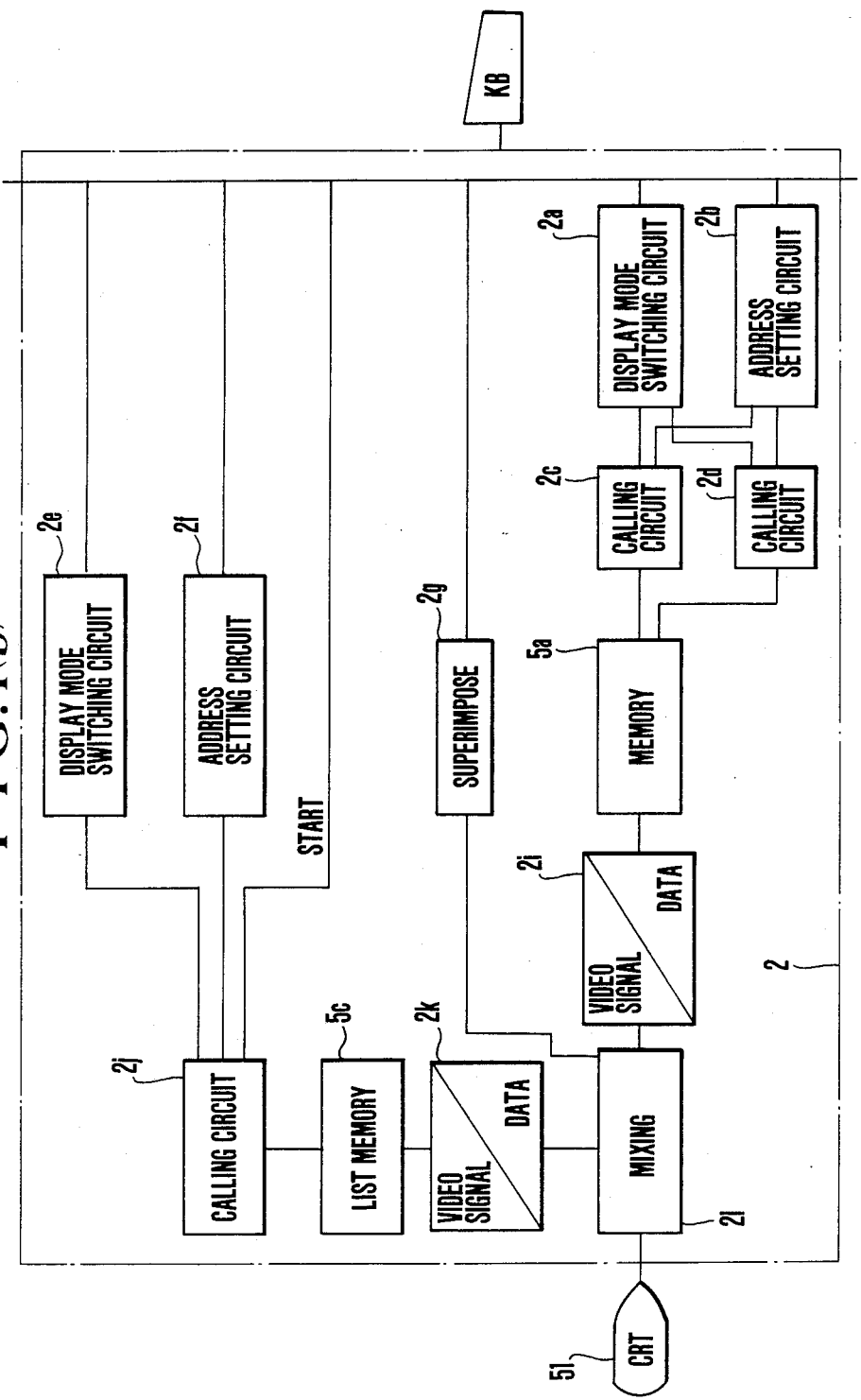
FIG. 1(b) shows the detailed structure of the display processing unit, which is a part of the structure of the device according to the present invention.

FIG. 1(a) is a block diagram of controlling operation which shows the structure of the present invention.

Referring to FIG. 1(a), the keyboard K.B of the operating apparatus 50 includes various keys arranged below the CRT shown in 2(b). When a menu is selected by pressing a key and a Start button (mode switching) is pressed, the "start of list inputting" is displayed, and three kinds of shape, namely, 1. a solid shape, 2. a shape having a drill hole in the center, and 3. a shape other than those indicated by the numbers 1 and 2 are displayed as an analogous shape of a work, as are indicated on the CRT 51 shown in FIG. 2(a). In any of the displayed shapes, starting point S is designated.

When information on the shape and dimensions of a work is made, judgement is made as to which of the above-described shapes the shape of the work, resembles and the number of the most analogous shape is selected. In this example No. 2 is selected and input by pressing the Menu key.

The distance between the coordinate of the starting point and the program original point is next set. In this example, X : . . . , Z : 25 are input by pressing the Numeral keys and the Input key 54d is pressed. When the Next Page key is pressed, a list which is used for list inputting is fetched from a memory 5c through a display switching circuit 2e a calling circuit 2j, and is displayed on the CRT 51 through a video signal/data 2k and a mixing circuit 21. The list table is displayed at the list display section of the CRT 51. The order in which data is input into the list table is induced by calling position data from a calling circuit memory 5e by the command of an address setting circuit 2f and instructed by turning on and off the inputting position through the video signal.

In this example, the Function key 52, the F4 key for indicating the mark [∕] and the cursor key 54b for indicating the mark [∕\] are selected to write the data on the design drawing the finished work shown in FIG. 4(a) and input as the signals. These inputs call the data of the element pattern by the commands from a display switching circuit 2a and an address setting circuit 2b, and superimposes the data by a converter 2i which converts the data to a video signal on the list table by the command of a superimpose 2g. The numeral 60 is also written in the same way.

The operating apparatus 50 having the CRT 51 and the keyboard K.B is directly connected to the CPU 1. A graphic information processing means 3 for indicating a graphic form is connected to the CPU 1, and a display memory 4 which stores the list table (work shape information) which is indicated by the graphic information processing means 3 is also connected to the CPU 1. As a result, shape and dimension data is input in the CRT 51 of the operating apparatus 50, and when the input has completed, the data is stored in the display memory 4.

A memory 5 for storing the patterns 5a (element mark, finishing mark, etc.) of an input signal, coordinate values 5b, list table 5c and interactive messages 5d is connected to the CPU 1. The patterns 5a (element mark, finishing mark, etc.) of an input signal, the coordinate values 5b (the starting points of the X and Z axes), and the list table 5c are used in this embodiment. The work shape graphic and the dimension data which are formed by image inputting method which has been already filed by the same applicant as that of the present invention are temporarily stored in the memory 4 by the operating apparatus, and are fetched from the memory 4 to be converted by a list converter 6 to a list similar to that disclosed in the present invention. The coordinate values of the list in the display memory 4 and the work shape list data are converted into the data based on the work original point by the operation processor of the CPU 1, and are input in the work shape list memory 7 as the position data to be used for machining together with the work shape data. The data input in the material list are processed by a setting processor 9 together with the machining data from a subprogram memory 8 for machining such as center work and bar work, as is disclosed by the same applicant in the specification under the title "APPARATUS FOR MAKING POSITIONING INFORMATION IN BAR WORK" filed on Apr. 17, 1985, and are stored in a machining information memory 20 as a subprogram memory.

Machining information is determined on the basis of the data of the work shape list memory 7 in the following way. Every means is connected to the CPU 1, and memories which have some relation with each step is also connected to the CPU 1.

To the CPU 1 is connected a tool selection processing means 19 for selecting a tool to be used for cutting an outer diameter, inner diameter or end surface, a tool decision processing unit 18 for determining the mounting position, correction number and mounting dimension of a tool to be used, a tool mounting position decision processing unit 17 for determining the mounting position of a tool, a machining order decision processing unit 16 for arranging the tools to be used in the appropriate order, a region division decision processing unit 15 for determining the range for each tool, a turret swivel position decision unit 14 for determining the swivel position of a turret head, a cutting condition decision unit 13 for determining the cutting conditions such as number of revolutions of the main spindle, a cutter path unit 12 for determining the notch and the stock allowance, and a cutting time decision processing unit 11 for executing automatic subroutines. The data of the work shape list memory 7 are subsequently processing by the unit 19 to 11 and the processed data are transferred to a machining processing unit 10.

The data transferred to the machining processing unit 10 is then delivered to a control device of an NC machine tool M for executing a predetermined machining under the control of the control device of the NC machine tool M.

In addition to the above-described decision processing means, the following memories are connected to the CPU 1: a tool file 27 for storing tool data, a machining order file 26 for storing the data on machining order, a tool path parameter memory 25 for storing a tool path parameter, a turret swivel file 24, a cutting condition file 23 for storing depth of cut, feed and the like, an output format parameter 22 for storing an output format parameter, and a parameter memory 21 for storing a parameter. Thus, the data stored in the memories 27 to 21 are stored subsequently in the machining information memory 20, whereby machining information is completed.

Among these processing unit, a device in accordance with the present invention uses the display processing unit 2, the operating apparaus 50, the graphic information processing unit 3, the display memory 4, the memory 5 for storing the pattern 5a, the list 5b, etc. of an input signal, the list converter 6 for converting an input element signal and input dimension data to the list, and the work shape list memory 7 for storing the work shape list which is converted by the list converter 6, and inputs the shape and the dimension data of a work into the shape list.

The operation of the device according to the present invention will now be explained.

Material input is started to display such a list as is shown in FIG. 3(b), in which no element and dimension data for a material is written, on the CRT 51 of the operating apparatus 50. The operator pictures the procedure steps of the shape of the material while seeing the design drawing of the material shown in FIG. 3(a), and inputs the elements and dimension data necessary for the steps 1 to 4 in the list shown in FIG. 3(b) by pressing the Function keys and the Numeral keys. The work shape list in which the elements and the dimension data are input are converted by the list converter 6 and is stored in the work shape list memory 7.

Such a list as is shown in FIG. 4(b), in which no element and dimension data is written and which is stored in the memory 5c is next displayed on the CRT 51 of the operating apparatus 50.

The operator pictures the procedure steps of the shape of a finished work while seeing the design drawing of the finished work shown in FIG. 4(a), and inputs the elements and dimension data necessary for the steps 1 to 9 in the list shown in FIG. 4(b) by pressing the Function keys and the Numeral keys. The work shape list in which the elements and the dimension data are input is temporarily stored in the display memory 4, then operated by the CPU 1 and is stored in the work shape list memory 7 as the coordinate position data showing the position in the coordinate based on the machining point of the work.

The work shape lists of the material and the finish work which are stored in the work shape list memory 7 are set in case of necessity, and thereafter the data of the work shape list memory 7 are processed by the steps 19 to 10. The information thus obtained by machining information processing is stored in the machining information memory 20.

The device for inputting the shape of a work according to the present invention is suitable for an expert who is unsatisfied with a conventional interactive input device and enables quick input of the shape of a work. In addition, it facilitates a change in procedures such as a change in or the rewrite of the shape of a work or dimension data due to a change in the design drawing during machining. Furthermore, since a list is displayed on the CRT, which items are to be input is clear, whereby an error in input is avoided.

As described above, the list inputting device according to the present invention can advantageously readily cope with automatic subroutine.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A device for inputting data in list form representing the shape of a desired work comprising:

an operating unit having a display unit;

a display processing means for displaying a graphic for selecting elements making up the shape of the work, and either a graphic of a blank list form or a graphic of the list form including input machining data on said display unit;

a graphic information processing means for converting numeric information into graphic information which is displayed on said display unit by said display processing means;

a memory for storing the pattern of the elements of the shape and the machining data of said graphic list;

a display memory for storing said graphic of said blank list form and said list form including input machining data, said graphic of said blank list form and said list form including input machining data having been processed by said graphic information processing means in order to display said two lists on said display unit;

an arithmetic unit for converting the data within said display memory into data representing a coordinate position on the basis of an original machining point;

a work shape list memory for storing the result of the calculation in said arithmetic unit; and a central processing unit which controls said memories and said processing means.

* * * * *